INVENTOR.
DAVID E. BULLARD

United States Patent Office 3,198,585
Patented Aug. 3, 1965

3,198,585
VEHICLE RETARDER SYSTEM
David E. Bullard, Washington, Ill., assignor to Caterpillar Tractor Co., Peoria, Ill., a corporation of California
Filed Sept. 13, 1963, Ser. No. 308,763
5 Claims. (Cl. 303—7)

This invention relates to retarders of the fluid type used on heavy vehicles to augment braking by conventional brakes on long downhill runs to prevent overheating and excessive brake wear and pertains more particularly to control means to limit retarder system pressures and to insure proper sequencing of operation of retarders used on tractor-trailer combinations.

Fluid retarders of well known types include closely spaced relatively rotatable parts in a fluid tight housing and means for introducing hydraulic fluid to the housing under pressure to reduce the speed of rotation and thus the speed of a vehicle by means of which the retarder is driven. The fluid absorbs the heat of friction in the retarder and is usually circulated through a heat exchanger for the purpose of dissipating the heat. Pressure must be limited in retarders and particularly in heat exchangers to prevent failure. Furthermore where retarders are used on both components of a tractor-trailer combination, it is desirable, as with brakes, to apply the retarder on the trailing vehicle first in order to prevent any tendency of the combination to jackknife.

It is the object of the present invention to provide valve means in a retarder system for limiting pressure in the system and for insuring the actuation of one or more retarder means in advance of others in the same system.

Further and more specific objects and advantages and the manner in which the invention is carried into practice are made apparent in the following specification wherein the invention is described in detail by reference to the accompanying drawings.

Figure 1:
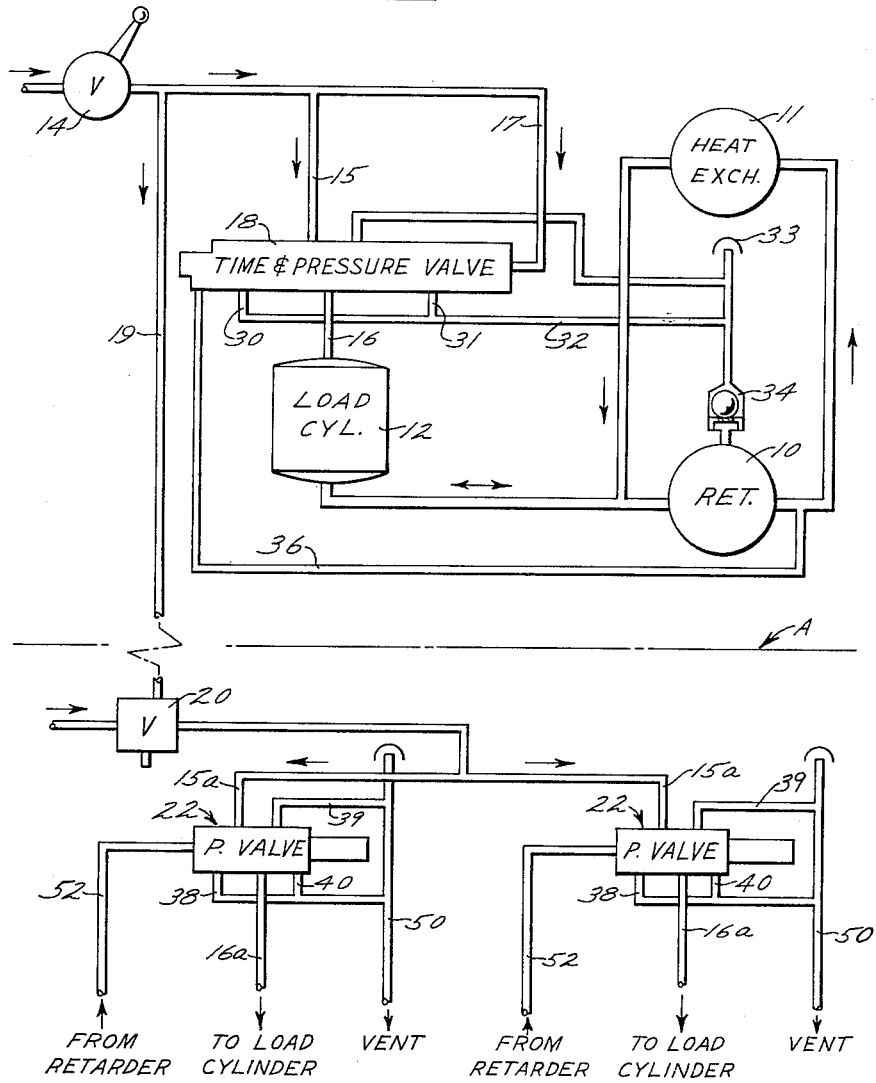
FIG. 1 is a schematic view of a retarder system for a tractor-trailer combination with some components omitted.

The retarder system illustrated in FIG. 1 of the drawings is shown with the parts carried by a tractor above the broken line A and the parts carried by the trailer below the line. The tractor system includes a retarder 10 in circuit with a heat exchanger 11 and a load cylinder 12 containing sufficient hydraulic fluid to enable the system to be charged with pressure from a suitable supply of air under pressure (not shown) controlled by a valve 14. The system thus far described is entirely conventional and the components may be of any well known make.

The trailer may have two retarders (not shown) which can be driven by the axles of the vehicle while the tractor is shown with a single retarder which is usually driven by the drive shaft. Since the two systems on the trailer both include a retarder, heat exchanger and load cylinder which may be similar to or identical to the system on the tractor, they are not disclosed in the drawings.

In operation, when the air valve 14 is opened, air under pressure is directed through a line 15 and a line 16 to the load cylinder in order to charge the system with retarding pressure. However, air is at the same time communicated through a line 17 to operate a time and pressure valve, generally indicated at 18 and shown in FIG. 2, to prevent operation of the retarder on the tractor before the retarders on the trailer have been actuated. The same air under pressure released through the valve 14 passes through a line 19 to the trailer to actuate a relay valve 20 thereon which is of conventional construction and which, upon actuation, admits air under pressure from a suitable source (not shown) to pressurize the retarder systems on the trailer. These systems include identical pressure valves shown at 22 and illustrated in detail in FIG. 3. These valves do not include time delay mechanisms such as that of the valve 18 and therefore the retarders on the trailer are actuated instantly upon opening of the valve 14 and a sufficient time, which need be no more than a fraction of a second before application of the retarders on the truck, to insure against jackknifing of the combination.

Figure 2:
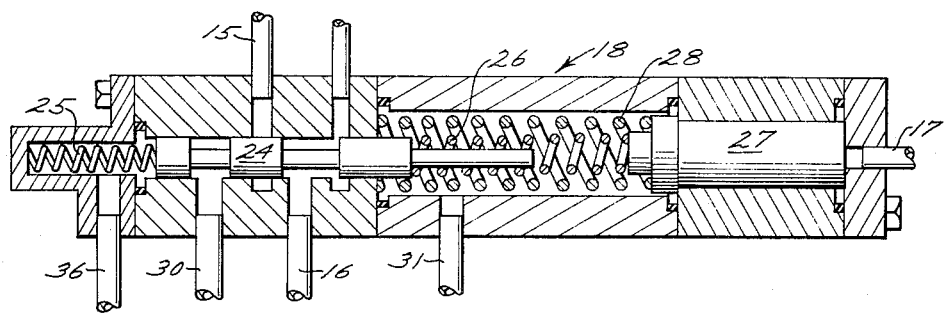
FIG. 2 is a schematic sectional view of one of the valves of the present invention.

In FIG. 2, the valve 18 is shown with a spool 24 normally held in the closed position illustrated by two springs 25 and 26 engaging its opposite ends. When air under pressure is admitted to the valve through the line 17, it moves a piston 27 to the left as viewed in FIG. 2 under the retarding force of a heavier spring 28 disposed between an inner wall of the housing and the piston. This movement also compresses the spring 26 which is disposed between the valve spool and the end of the piston and urges the spool to its open position where communication is permitted between lines 15 and 16. Air pressures at the ends of the spool are maintained equal by lines 30 and 31 communicating through a common line 32 (see FIG. 1) with a vent 33. The same vent serves the retarder 10 when it is not under pressure but is closed with respect to the retarder when it is pressurized by a check valve 34. The same valve 18 is employed to prevent excessive pressure in the retarder and heat exchanger by cutting off the supply of pressure to the load cylinder when the pressure in the system attains a predetermined maximum. This is accomplished by a line 36 (see FIGS. 1 and 2) which communicates hydraulic pressure in the retarder system to the chamber of spring 25 as shown in FIG. 2. Thus, pressure exceeding a predetermined value augments the force of spring 25 and overcomes the force of spring 26 to move the spool 24 toward its closed position and maintain the desired pressure of hydraulic fluid in the system.

Figure 3:
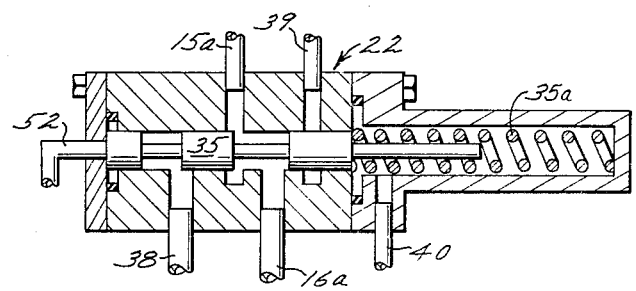
FIG. 3 is a similar view of another valve.

The valves 22 in the trailer systems operate similarly to the valve 18 in regulating pressure but do not include time delay mechanism. As illustrated in FIG. 3 each valve 22 has a spool 35 normally held in its open position by a spring 35a to permit flow of air under pressure from a line 15a to a line 16a leading to the load cylinder of the system with which the valve is associated. Pressures which might effect the position of the spool are vented through lines 38, 39 and 40 connected with a common vent line 50 shown in FIG. 1. Hydraulic pressure from the retarder system is communicated to one end of the valve spool 35 by a line 52 serving to move the valve spool toward its closed position against the force of spring 36 as the desired pressure limit in the system is attained.

I claim:

1. A retarder system including a retarder device adapted to contain fluid under pressure, a load cylinder in circuit with the retarder device, means to introduce fluid under pressure from a different circuit to the load cylinder to increase pressure in the retarder circuit, said last means including a valve, and means to communicate pressure from the retarder circuit to said valve to close the valve when pressure in the retarder circuit attains a predetermined value.

2. The combination of claim 1 in which closing of the valve is opposed by resilient means.

3. A retarder system for a tractor-trailer combination including retarding means on the tractor, a second retarding means on the trailer, a source of air under pressure, a first valve controlling flow of air from said source to actuate the tractor retarding means, a source of air under pressure for the trailer retarding means, an air actuated relay valve controlling said latter source, means to communicate air from the first valve when it is open the relay valve and means for preventing fluid pressure in at least one of said retarding means from exceeding a predetermined level, said last means including a valve, and means to communicate pressure from the retarder to said last mentioned valve to close the last mentioned valve at a predetermined retarder pressure.

4. The combination of claim 3 with means to delay actuation of the tractor retarding means until the trailer retarding means has been actuated.

5. The combination of claim 4 with an air control valve for each retarding means and in which the delay is occasioned by resilient means opposing the opening of the control valve for the tractor retarding means.

References Cited by the Examiner
UNITED STATES PATENTS

| | | |
|---|---|---|
| 2,702,096 | 2/55 | Rockwell. |
| 2,808,902 | 10/57 | Williams _____ 303—7 |
| 2,963,117 | 12/60 | McGill _____ 188—86 |
| 3,051,273 | 8/62 | Cordiano et al. _____ 188—90 |
| 3,057,666 | 10/62 | Sieving et al. _____ 188—90 X |

FERGUS S. MIDDLETON, *Primary Examiner.*

UNITED STATES PATENT OFFICE
CERTIFICATE OF CORRECTION

Patent No. 3,198,585                                    August 3, 1965

David E. Bullard

It is hereby certified that error appears in the above numbered patent requiring correction and that the said Letters Patent should read as corrected below.

Column 3, line 4, before "the" insert -- to open --.

Signed and sealed this 18th day of January 1966.

(SEAL)
Attest:

ERNEST W. SWIDER                                                      EDWARD J. BRENNER
Attesting Officer                                                             Commissioner of Patents